United States Patent
Itou et al.

(10) Patent No.: US 6,199,265 B1
(45) Date of Patent: *Mar. 13, 2001

(54) METHOD OF SECURING MAGNETS OF REVOLVING ELECTRIC MACHINE

(75) Inventors: Katsutoshi Itou, Gunma; Shuji Uehara, Maebashi; Hiroshi Hiruma, Kiryu, all of (JP)

(73) Assignee: Mitsuba Corporation, Gunma (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,727

(22) Filed: Jun. 30, 1998

(30) Foreign Application Priority Data

Jul. 22, 1997 (JP) .................................................. 9-211384

(51) Int. Cl.⁷ ..................................................... H02K 15/00
(52) U.S. Cl. ................................. 29/596; 29/597; 29/598; 310/261
(58) Field of Search ............................. 29/598, 597, 596, 29/605; 242/432, 433; 310/261, 42, 43

(56) References Cited

U.S. PATENT DOCUMENTS

| | | | |
|---|---|---|---|
| 4,697,114 | * 9/1987 | Amemiya et al. | 310/261 |
| 4,829,657 | * 5/1989 | Wright | 29/596 |
| 4,996,456 | * 2/1991 | Strobl | 310/261 |
| 5,005,281 | * 4/1991 | Burns | 29/596 |
| 5,040,286 | 8/1991 | Stark . | |
| 5,095,611 | 3/1992 | Smith . | |
| 5,232,652 | * 8/1993 | Bianco | 29/598 |
| 5,319,844 | * 6/1994 | Haung et al. | 29/598 |

FOREIGN PATENT DOCUMENTS

| | | | |
|---|---|---|---|
| 2 632 788 | 12/1989 | (FR) | H02K/15/02 |
| 2707813 | * 7/1994 | (FR) . | |
| 2 707 813 | 1/1995 | (FR) | H02K/1/27 |
| 5-059661 | 3/1993 | (JP) | D06H/3/10 |

* cited by examiner

Primary Examiner—Lee Young
Assistant Examiner—Sean Smith
(74) Attorney, Agent, or Firm—McCormick, Paulding & Huber LLP

(57) ABSTRACT

When a magnet cover 21 is press-fitted into the inner peripheral surfaces of magnets 18 annularly arranged on the inner peripheral surface of a hollow cylindrical yoke 11 having at an end thereof a closure wall 12, the magnets 18 are arranged peripherally at regular intervals on the outer peripheral surface of the magnet cover 21 that is supported by the lower die 34. The yoke 11 is held by the upper die 31 and arranged coaxially relative to the magnet cover 21 with open end 14 directed to the magnet cover 21. As the upper die 31 and the lower die 34 are closed relative to each other, the magnets 18 and the magnet cover 21 are press-fitted into the yoke 11 as the outer peripheral surfaces 19 of the magnets 18 are pressed by the inner peripheral surface of the yoke 11. Thus, the magnets 18 are rigidly secured to the yoke 11 without arranging a through hole in the closure wall 12 of the yoke. Since magnets 18 and the magnet cover 21 can be press-fitted into the yoke 11 without boring a through hole in the closure wall 12 of the yoke 11, the process of filling the through hole after assembling the motor can be omitted to reduce the cost of manufacturing the motor.

9 Claims, 9 Drawing Sheets

METHOD OF SECURING MAGNETS OF REVOLVING ELECTRIC MACHINE

BACKGROUND OF THE INVENTION

1. Field of the Invention

This invention relates to a method of securing the magnets of a revolving electric machine in position. More particularly, this invention relates to a method of rigidly securing magnets to the yoke of the stator of an electric motor (hereinafter referred to as motor) or that of the rotor of a magnet generator (fly-wheel magnet generator), which method may find a wide variety of applications in the field of manufacturing motors to be used for the electric equipment of automobiles.

2. Related Art Statement

Electric motors comprising a plurality of magnets arranged annularly and peripherally at regular intervals along the inner peripheral surface of a hollow cylindrical yoke and rigidly secured in position by means of a hollow cylindrical magnet cover press-fitted to the inner peripheral surfaces of the magnets are widely used as the electric equipment of automobiles.

As a conventional magnet securing method such as the above kind, there is a magnet cover built-in method for a permanent magnet motor shown in Japanese Patent Publication No. 5-59661. With the disclosed method of arranging a built-in type magnet cover, a hollow cylindrical yoke having openings at the opposite ends is used in an ingenious manner. More specifically, magnets are arranged annularly and peripherally at regular intervals along the inner peripheral surface of the yoke and supported by a magnets-aligning jig introduced from one of the openings of the yoke, and a magnet cover is introduced from the other opening of the yoke and press-fitted to the inner peripheral surfaces of the group of magnets.

However, with the above described method, if a yoke with a closure wall end is used, the jig or the magnet cover cannot be introduced from the side of the closure wall of the yoke and it is impossible to arrange the magnet cover within the yoke.

This problem may be bypassed by providing the closure wall of the yoke with an opening, through which the jig can be introduced to align and support the magnets. Then, however, the stator of the motor has to be provided with a sealing means for hermetically sealing the opening that is used to introduce the jig in order to align the magnets. Otherwise, the motor will be devoid of water-resistance.

SUMMARY OF THE INVENTION

Therefore, the object of the present invention is to provide a method of rigidly securing the magnets of a revolving electric machine in position, with which magnets can be rigidly secured to a hollow cylindrical yoke having an end closed without forming an opening through the closure wall of the yoke.

According to the invention, the above object is achieved by providing a method of securing magnets of a revolving electric machine such that a plurality of magnets are annularly and peripherally arranged at regular intervals on the inner peripheral surface of a hollow cylindrical yoke having a closed end and rigidly secured by a hollow cylindrical magnet cover press-fitted to the inner peripheral surface of the magnets, characterized by comprising steps of:

temporarily holding the magnet cover by means of a lower die of a press frame having upper and lower dies to be closed relative to each other and arranging the plurality of magnets peripherally along the outer periphery of the magnet cover; and securing the yoke to the upper die, arranging the yoke coaxially relative to the magnet cover with the opening side of the yoke directed to the magnet cover, closing the upper die and the lower die relative to each other and then press-fitting the magnets and the magnet cover into the yoke, while pushing the outer peripheral surfaces of the magnets by means of the inner peripheral surface of the yoke.

Further, the magnets arranged along the outer periphery of the magnet cover may be supported by a pair of anti-fall jigs for the magnets until the magnets are partly introduced into the yoke.

Additionally, the anti-fall jigs may be arranged radially movably relative to the upper and lower dies and the magnets arranged along the outer periphery of the magnet cover may be pushed radially from outside by the anti-fall jigs.

Furthermore, the magnet cover may be held by a magnet cover holding member vertically movably fitted to the lower die.

Additionally, the cover holding member may operate also as an anti-fall jigs for holding the magnets and the magnets may be axially pushed from outside by the magnet cover holding member.

For the purpose of the invention, the lower die may be provided with a resilient member adapted to abut the inside of the top of the magnet cover when the magnet cover is temporarily held by the lower die, the resilient member is compressed and radially and outwardly bulged by closing the upper and lower dies relative to each other, so that the magnet cover is bulgy deformed and positioned axially.

Further, a radially and outwardly projecting outside collar may be formed at an end of the magnet cover and provided with as many small holes as the magnets, the small holes being arranged at regular intervals corresponding to the intervals of the magnets; and the lower die may be provided with aligning projections adapted to be received respectively by the small holes in order to peripherally align the magnets when the upper and lower dies are closed relative to each other.

With a method according to the invention, since when the magnets are secured by the magnet cover the magnets and the magnet cover are positioned in the yoke and the lower die, receiving the reaction force of the yoke, is introduced into the yoke through the opening thereof and, while the yoke is pressed by the upper die. Thus, the yoke does not have to be provided with through holes bored through the closure wall thereof. Therefore, the motor is free from the operation of closing the through holes that will otherwise be necessary to hermetically seal the stator after assembling the motor so that the overall manufacturing cost of the motor can be reduced.

The above described and other objects and novel feature of the present invention will become apparent more fully from the following specification described in conjunction with the accompanying drawings.

DESCRIPTION OF THE PREFERRED EMBODIMENT

Figure 1:
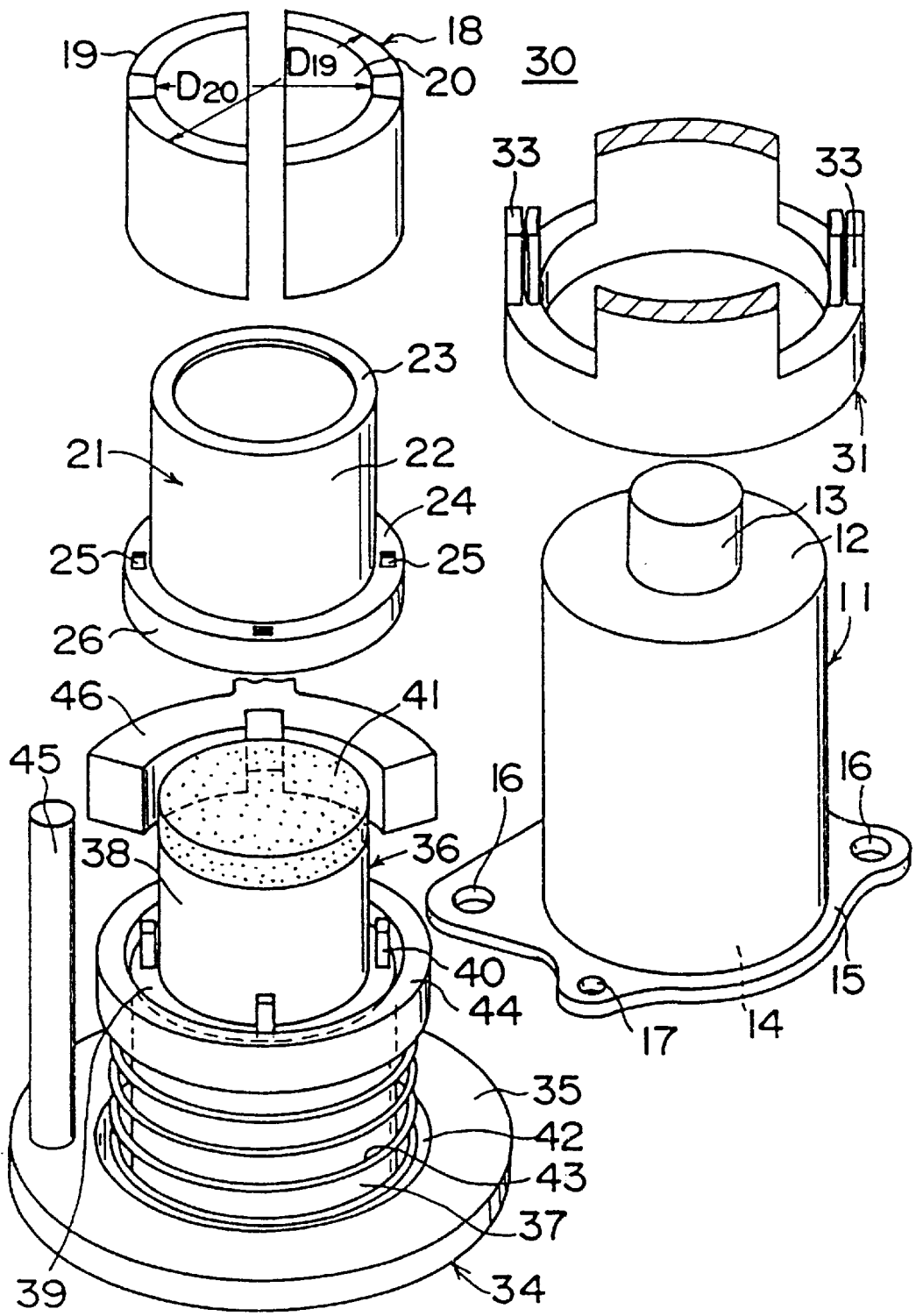
FIG. 1 is an exploded partly omitted perspective view showing a first embodiment of a method of securing magnets of a motor in position according to the present invention.

FIG. 1 is an exploded partly cut away perspective view showing a first embodiment of a method of securing magnets of a motor in position according to the present invention. FIGS. 2(a) through 5(b) shows each step of securing the magnets of the motor. FIGS. 6(a) and 6(b) show a stator to which the magnets are rigidly secured.

In this embodiment, a method of securing magnets of a revolving electric machine of the invention is shown as a method of securing magnets of a motor using a hollow cylindrical yoke that is closed at an end. The stator 10 of the motor is formed integrally with a hollow cylindrical yoke 11 having a closed end by means of deep draw plastic working. The closure wall 12 of the yoke 11 has a bearing containing section 13 projecting therefrom as integral part thereof and formed integrally also by deep draw plastic working. The yoke 11 is provided at the outer periphery of the open end 14 thereof integrally with a radially and outwardly extending flange 15 that is substantially lozenge-shaped. The flange 15 has a plurality of through holes 16 for receiving screws for rigidly securing an end bracket in position. The flange 15 additionally has a plurality of aligning holes 17 arranged at predetermined positions.

A total of four magnets 18 are arranged peripherally at regular intervals on the inner peripheral surface of the yoke 11 to form field poles of the motor. Each of the magnets is hexahedral of shape and has an arcuate cross section. When the four magnets 18 are press-fitted to the inner peripheral surface of the yoke 11, the outer peripheral surfaces of the magnets 18 define an outer diameter $D_{19}$ substantially equal to the inner diameter of the yoke 11. Note that the outer diameter D19 is slightly greater than the inner diameter of the yoke 11 before the magnets 18 are press-fitted into the yoke 11. Similarly, the inner diameter $D_{20}$ defined by the inner peripheral surfaces 20 of the magnets 18 is slightly smaller than the outer diameter of the main body of a magnet cover before assembling, which will be described hereinafter.

The magnet cover 21 is made of a very thin plate typically of stainless steel and has a hollow cylindrical profile. It is provided at the opposite ends thereof integrally with respective collars 23 by plastic working. More specifically, the hollow cylindrical main body 22 of the magnet cover 21 has at an end thereof a coaxial circular inside collar 23 perpendicularly projecting radially and inwardly from the main body 22. And the main body 22 has at the other end thereof a coaxial circular outside collar 24 perpendicularly extending radially and outwardly from the main body 22. The outward collar 24 shows a width slightly smaller than the thickness of the magnets 18 before assembling. The outward collar 24 is provided peripherally and annularly with small holes 25 arranged at regular intervals, the number of which is equal to that of the magnets 18. The small holes 25 have a width in peripheral terms slightly greater than the gap separating any adjacently located two magnets 18, 18. A shallow cylindrical rigidity providing section 26 is formed along an edge of the outer periphery of the outside collar 24 and extending axially outwardly from and coaxially with the outside collar 24. As a result, bulged sections 27 for peripheral alignment and a bulged section 28 for axial alignment will be formed on the main body 22 of the magnet cover 21 by means of a method of rigidly securing magnets according to the invention in a manner as will be described hereinafter.

In this embodiment, a method of rigidly securing magnets according to the invention is carried out by a magnet-securing device having a configuration as described below. The magnet securing device 30 has a press frame comprises an upper die and a lower die that are closed relative to each other by means of a press unit (not shown). The upper die 31 is formed like a hanging bell shape and has an inner diameter slightly greater than the outer diameter of the yoke 11. It is adapted to abut the closure wall 12 of the yoke 11 and push down the latter from above. The upper die 31 is provided at the top thereof with a link section 32, by means of which the upper die 31 is linked to the ram of the press unit. The upper die 31 is further provided on the barrel thereof with a pair of yoke holders 33, which may be cylindrical holders or electromagnetic plungers. The yoke holders 33 are arranged oppositely relative to each other at positions where they do not interfere with the link sections 32. The yoke holders 33, 33 pinch the barrel of the yoke 11 from the opposite sides.

The lower die 34 has a disc-shaped base 35 secured on the ground. A cylindrical column 36 is standing vertically and coaxially from the upper surface of the base 35 and has a large diameter section 37 and a small diameter section 38 separated by a step that provides a horizontal and annular receiving section 39 for receiving the outer collar 24 of the magnet cover 21. A total of four aligning projections 40 are standing axially from the upper surface of the receiving section 39 and arranged peripherally at regular intervals. The aligning projections 40 are received respectively by the four small holes 25 of the outer collar 24 of the magnet cover 21. A disc-shaped resilient body 41 of rubber or resin is bonded to the top of the column 36 by baking.

The outer diameter of the small diameter section 38 is slightly smaller than that of inner diameter of the main body 22 of the magnet cover 21. The outer diameter of the large diameter section 37 is slightly smaller than the inner diameter of the section 26 of the magnet cover 21.

A spring seat 42 is formed in an annular groove shape and it is arranged coaxially on the base 35 and around the outer periphery of the column 36. A compression coil spring (hereinafter simply referred to as spring) 43 is carried by the spring seat 42. An annular keep ring (magnet cover holding member) 44 is horizontally arranged at the top of the spring 43. The ring 44 partly covers both the section 37 and the section 38 of the column 36 by its inner peripheral surface and its top surface is located vis-a-vis with the lower surface of the flange 15 of the yoke 11. A guide pole 45 is vertically standing outside the spring seat 42 from the upper surface of the base 35 at a predetermined position relative to the projections 40. The guide pole 45 is adapted to pass through one of the through holes 16 of the yoke 11.

A pair of substantially semi-circular magnet keep members (anti-fall jigs for the magnets) 46 are radially movably arranged outside the column 36. The members 46 are symmetrically arranged and extend upward from a position facing the receiving section 39. The two magnet keep members 46 are driven to move by means of cylindrical holders or electromagnetic plungers (not shown).

In this embodiment of carrying out the invention, the magnets of the motor are secured in position in a manner as described below by means of the above described magnet-securing device.

Figure 2:
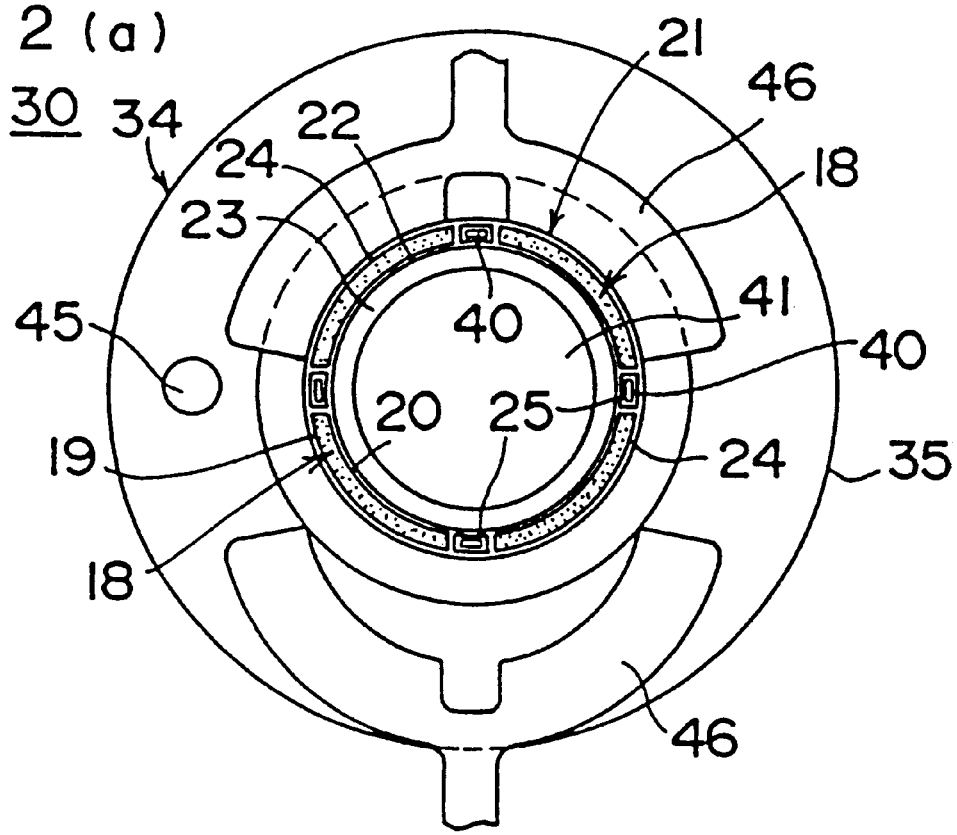
FIG. 2(a) is a schematic plan view showing the step of assembling the magnets and the magnet cover.
FIG. 2(b) is a schematic sectional front view corresponding to FIG. 2(a).
Figure 2:
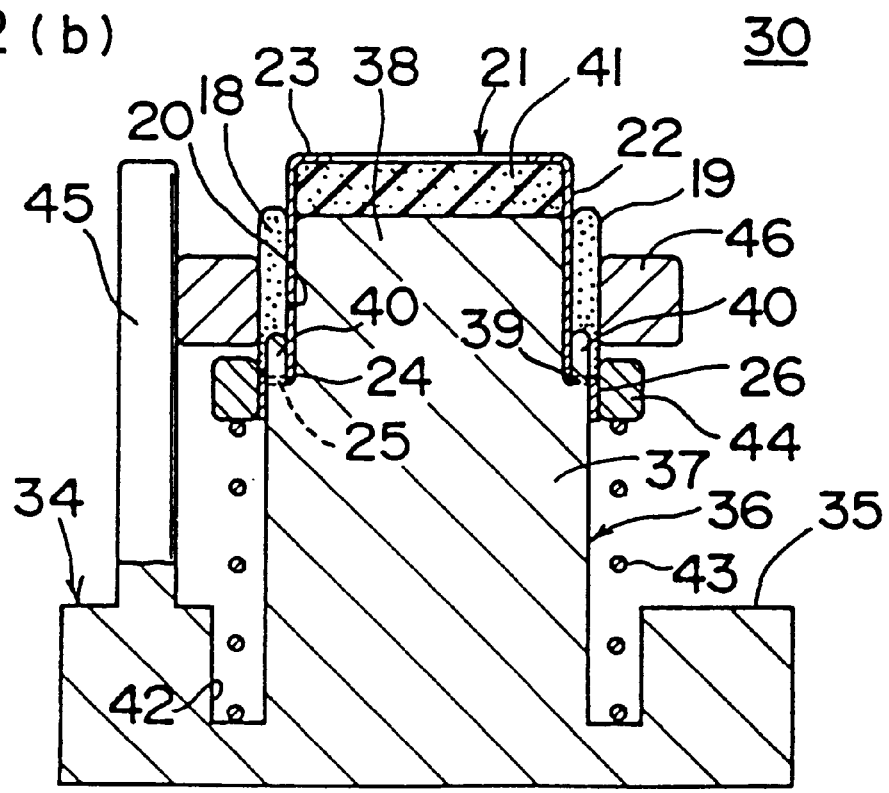

Referring to FIG. 2, the magnet cover 21 is made to cover the section 38 of the column 36 of the die 34 with the collar 24 facing downward in such a way that the section 26 of the magnet cover 21 becomes engaged with the large diameter section 37 of the column 36 and the projections 40 standing from the section 39 are received by the four respective small holes 25 of the collar 24. Thus, the collar 24 is stably received by the section 39. The collar 23 of the magnet cover 21 abuts the resilient body 41 on the top of the column 36 under this condition.

Subsequently, each of the four magnets 18 are arranged between two adjacently located projections 40, 40 standing from the collar 24 of the magnet cover 21 to substantially produce a ring of magnets. Note that each of the magnets 18 is made to abut the inner peripheral surface of the ring 44 at the lower peripheral edge thereof so that it is temporarily secured there. Thus, the magnets 18 are peripherally aligned with the die 34 by means of the projections 40. Then, the arranged four magnets 18 are pushed radially from outside by the pair of magnet keep members 46, 46 so that the magnets 18 would not fall radially outwardly.

Figure 3A:
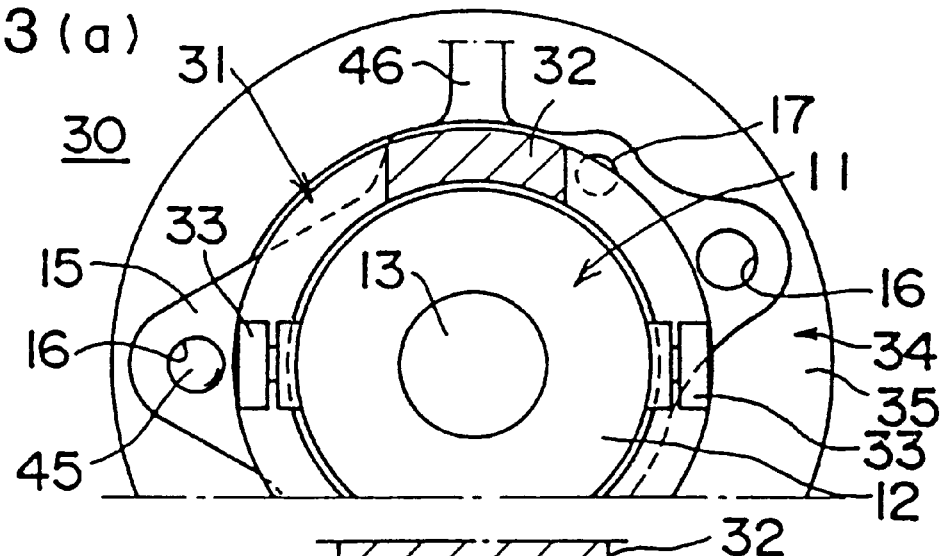
FIG. 3(a) is a schematic plan view showing the step of assembling the yoke.
Figure 3B:
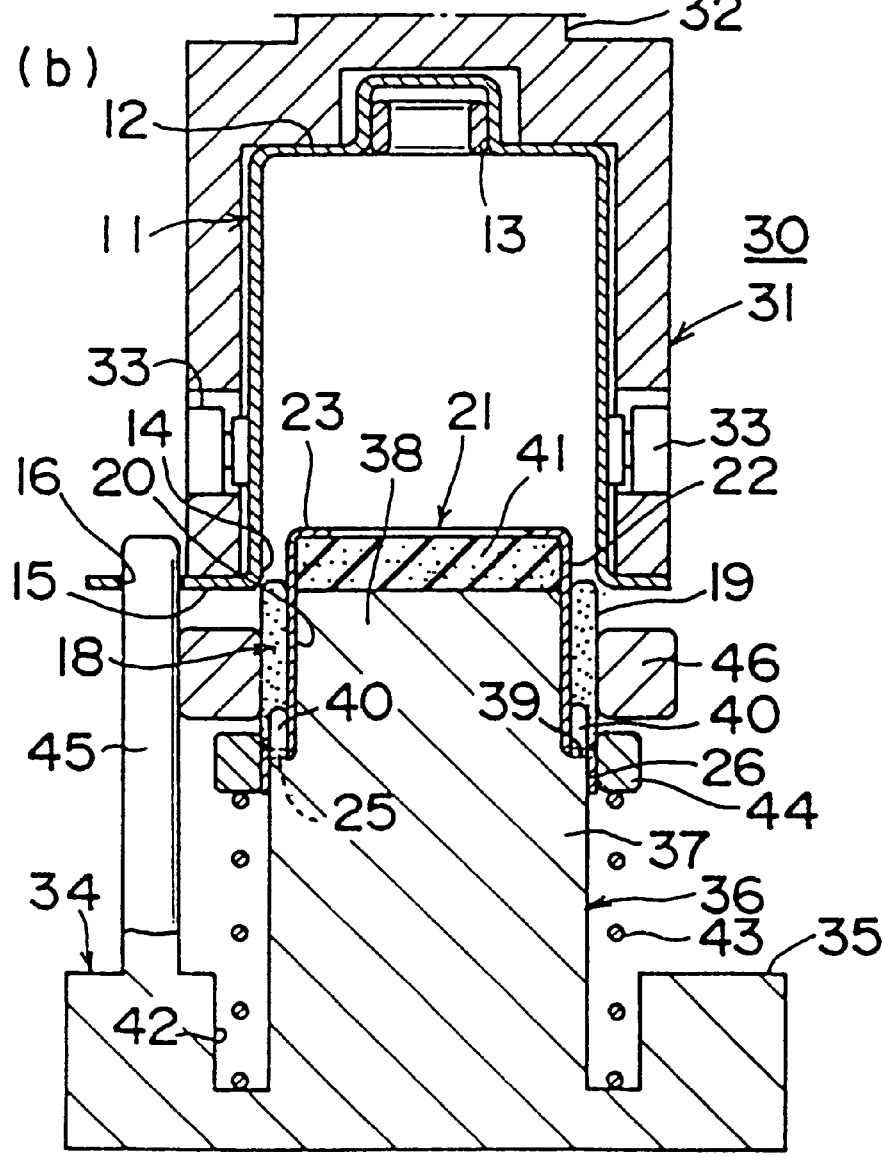
FIG. 3(b) is a schematic sectional front view corresponding to FIG. 3(a).

Referring to FIG. 3, the yoke 11 that is held to the die 31 by means of the pair of yoke holders 33, 33 is arranged coaxially right above the column 36 of the die 34. Then, the guide pole 45 of the die 34 is received by the corresponding through hole 16 of the yoke 11 to accurately align the magnets 18 and the yoke 11.

Figure 4:
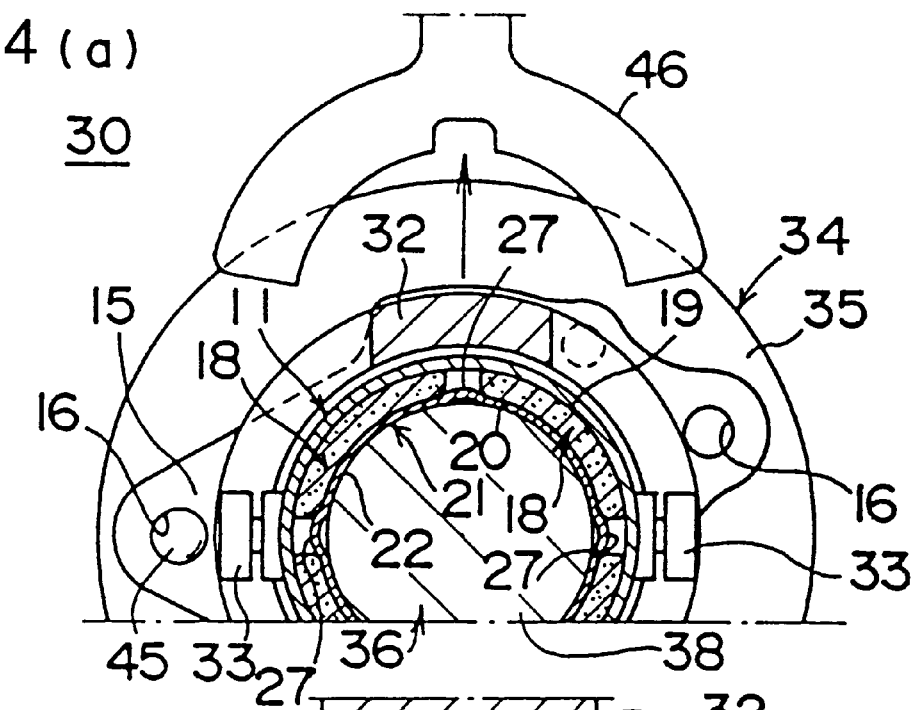
FIG. 4(a) is a partly sectioned schematic plan view showing an initial stage of the press-fitting operation.
FIG. 4(b) is a schematic sectional front view corresponding to FIG. 4(a).
Figure 4:
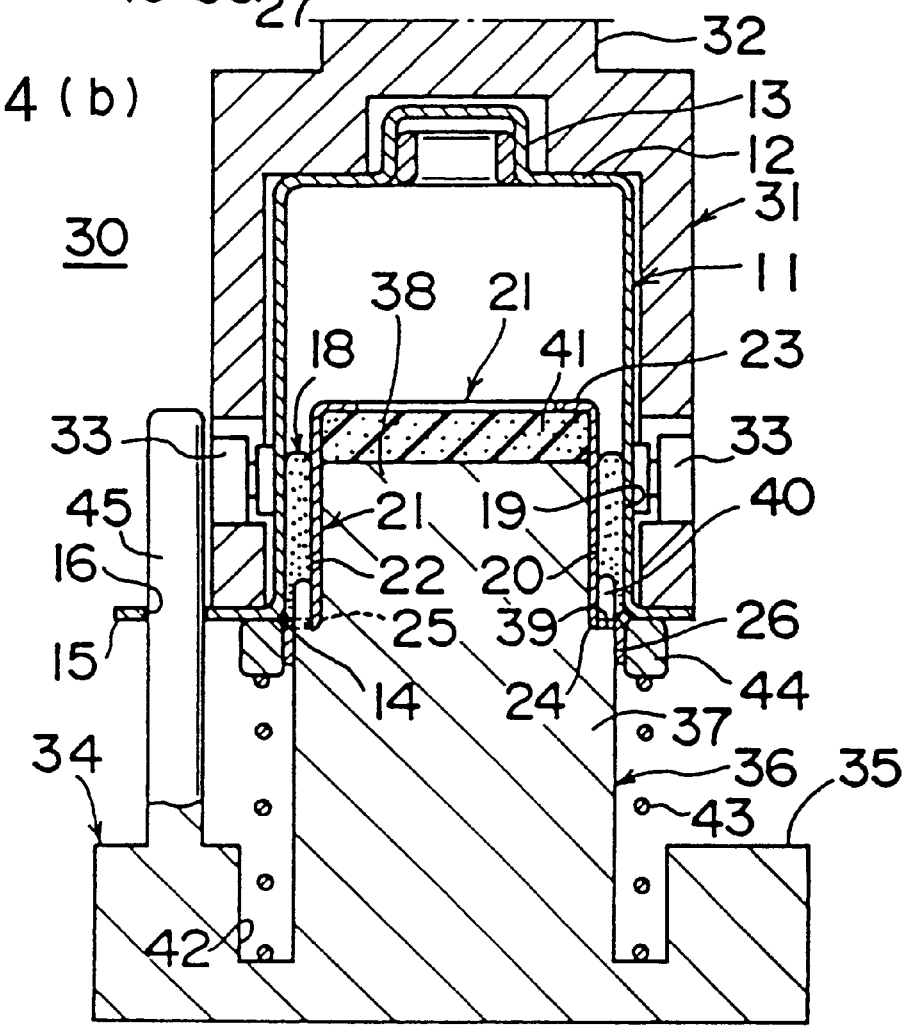

Then, referring to FIG. 4, as the die 31 is gradually lowered by the press unit, the yoke 11 moves downward as it is guided by the guide pole 45 passing through the corresponding through hole 16. Note that the top of the each magnets 18 is beveled along the outer peripheral edge thereof. The inner peripheral edge of the flange 15, that is, the boundary between the flange 15 and the cylindrical portion of the yoke 11 is rounded. Therefore, as the rounded inner peripheral edge of the yoke 11 or the flange 15 abuts the beveled outer peripheral edges of the magnets 18 and the yoke 11 is lowered further, the magnets 18 are placed coaxial with the yoke 11 and start to become press-fit into the yoke 11, pushing the magnet cover 21 radially inwardly. As the yoke 11 is lowered further, it slides on the outer peripheral surfaces of the magnets 18, pushing them radially inwardly by its inner peripheral surface because the magnets 18 and the magnet cover 21 are securely supported by the section 39 of the die 34. The pair of magnet keep members 46, 46 holding the magnets 18 can obstruct the downward movement of the yoke 11 relative to the magnets 18 and the magnet cover 21. Therefore, the members 46, 46 are made to move radially outwardly by means of the cylindrical holder as the die 31 is lowered so that they may not provide any obstacle to the lowering movement of the yoke 11.

The outer diameter $D_{19}$ defined by the surfaces 19 of the magnets 18 before press-fitting operation is slightly greater than the inner diameter of the yoke 11. Similarly, the inner diameter $D_{20}$ defined by the surfaces 20 of the magnets 18 after the press-fitting is lightly smaller than the outer diameter of the main body 22 of the magnet cover 21 before the press-fitting. Thus, the magnets 18 and the magnet cover 21 are successfully press-fitted into the yoke 11 as a result of the relative movement of the yoke 11 and the magnets 18 and the magnet cover 21. As the magnets 18 are pushed radially inwardly by the yoke 11, the main body 22 of the magnet cover 21 is pushed radially inwardly by the magnets 18.

As a result, the main body 22 of the magnet cover 21 is forced to outwardly bulge by the magnets 18 to produce bulged sections 27 to be used for peripheral alignment between any two adjacently located magnets 18, 18. The magnets 18 are prevented from moving peripherally by the bulged sections 27. Additionally, the magnets 18 are pressed against the inner peripheral surface of the yoke 11 by the resilient force of the main body 22 of the magnet cover 21. Accordingly, the yoke 11, the magnets 18 and the magnet cover 21 are tightly and integrally held to each other. Still additionally, since the small diameter section 38 of the column 36 has an outer diameter slightly smaller than the inner diameter of the main body 22 of the magnet cover 21, the magnets 18 will be prevented from pressing against the section 38 and from cracking thereby.

Figure 5A:
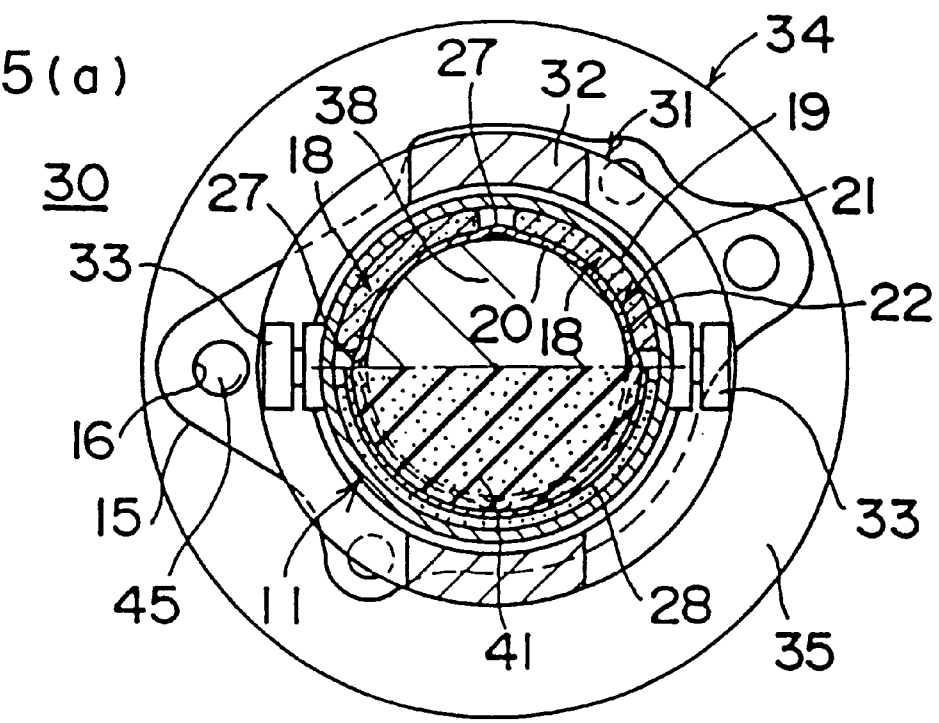
FIG. 5(a) is a partly sectioned schematic plan view showing a final stage of the press-fitting operation.
Figure 5B:
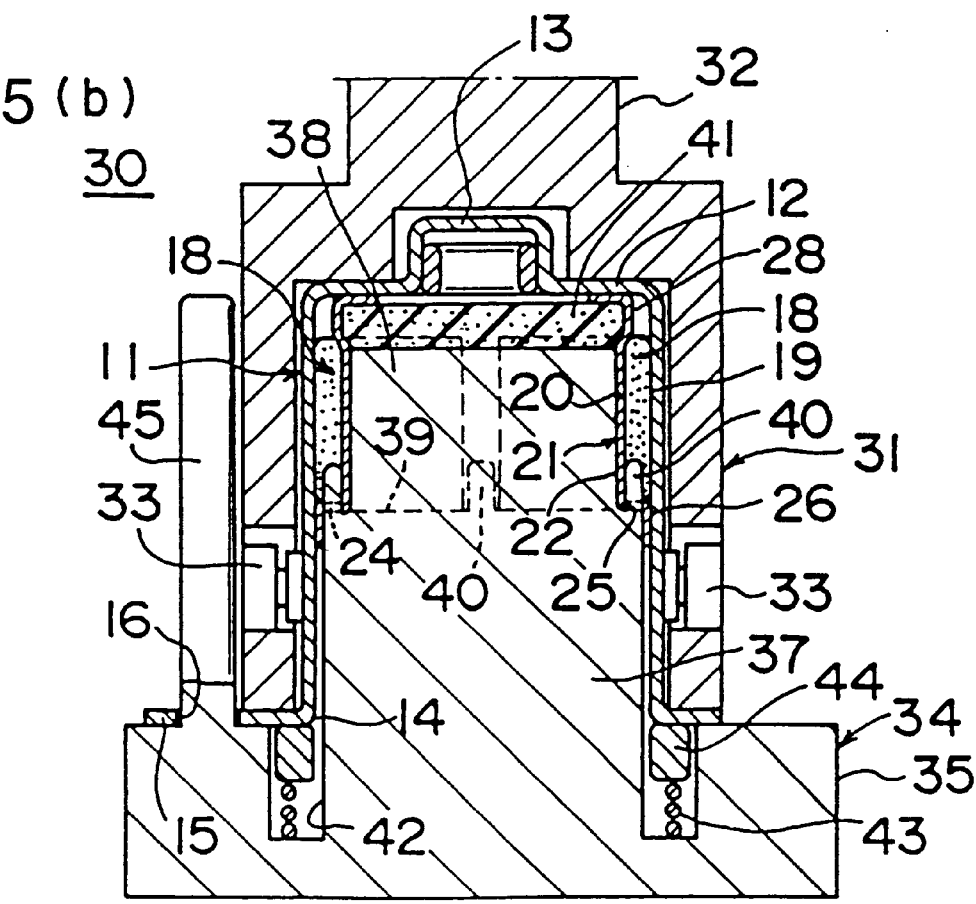
FIG. 5(b) is a schematic sectional front view corresponding to FIG. 5(a).
Figure 6A:
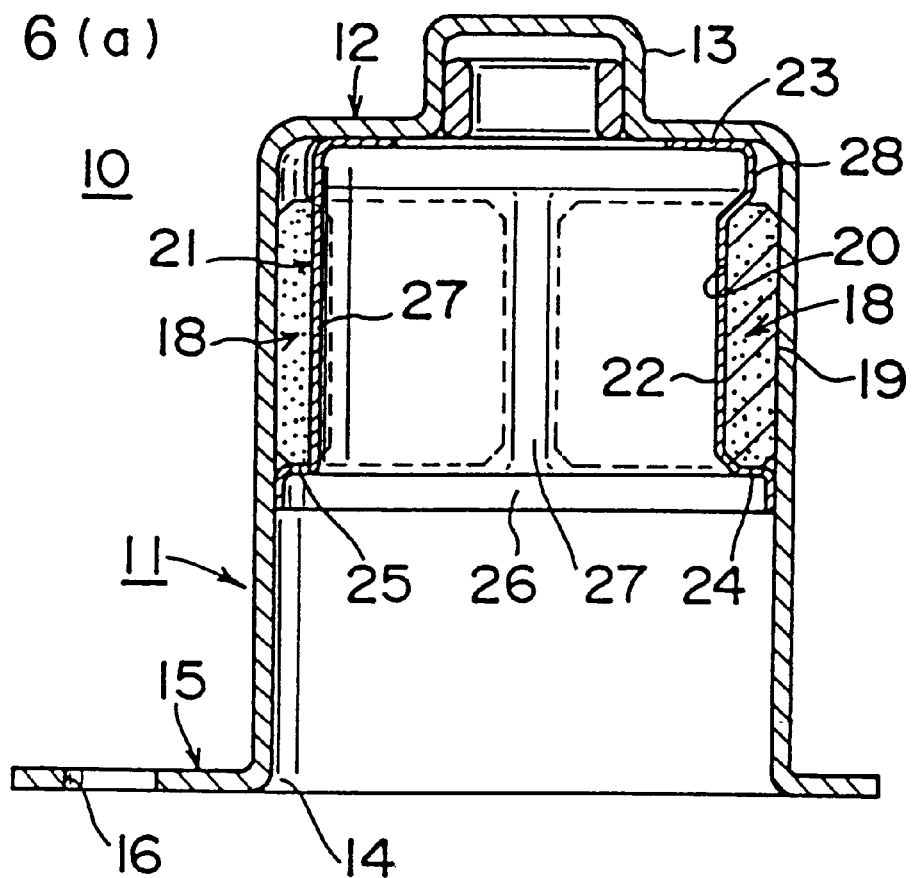
FIG. 6(a) is a sectional front view showing the rigidly secured yoke.
Figure 6B:
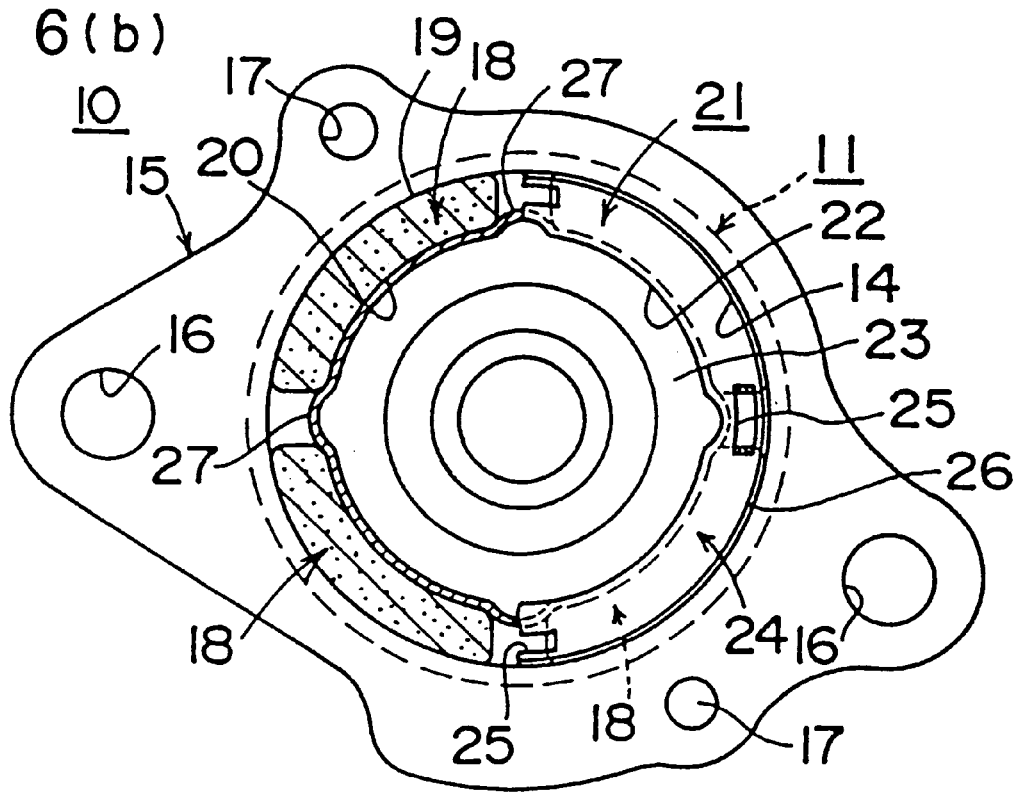
FIG. 6(b) is a partly sectioned bottom view corresponding to FIG. 6(a).
Figure 7:
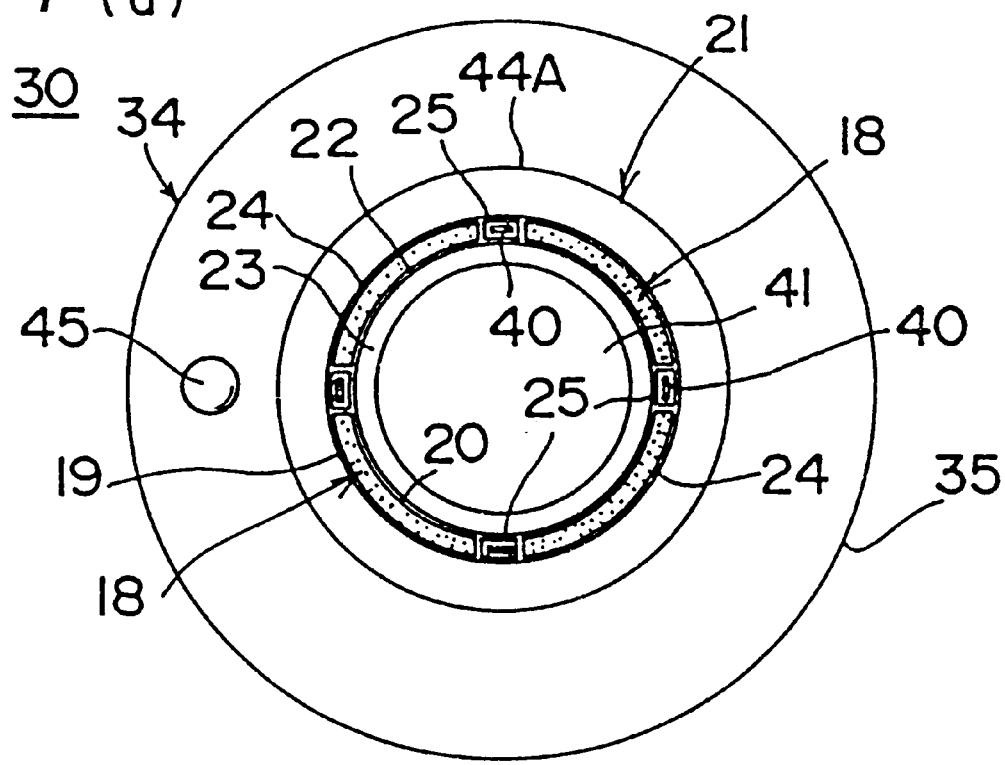
FIG. 7(a) is a schematic plan view showing the step of assembling the magnets and the magnet cover of a second embodiment of the invention.
FIG. 7(b) is a schematic sectional front view corresponding to FIG. 7(a).
Figure 7:
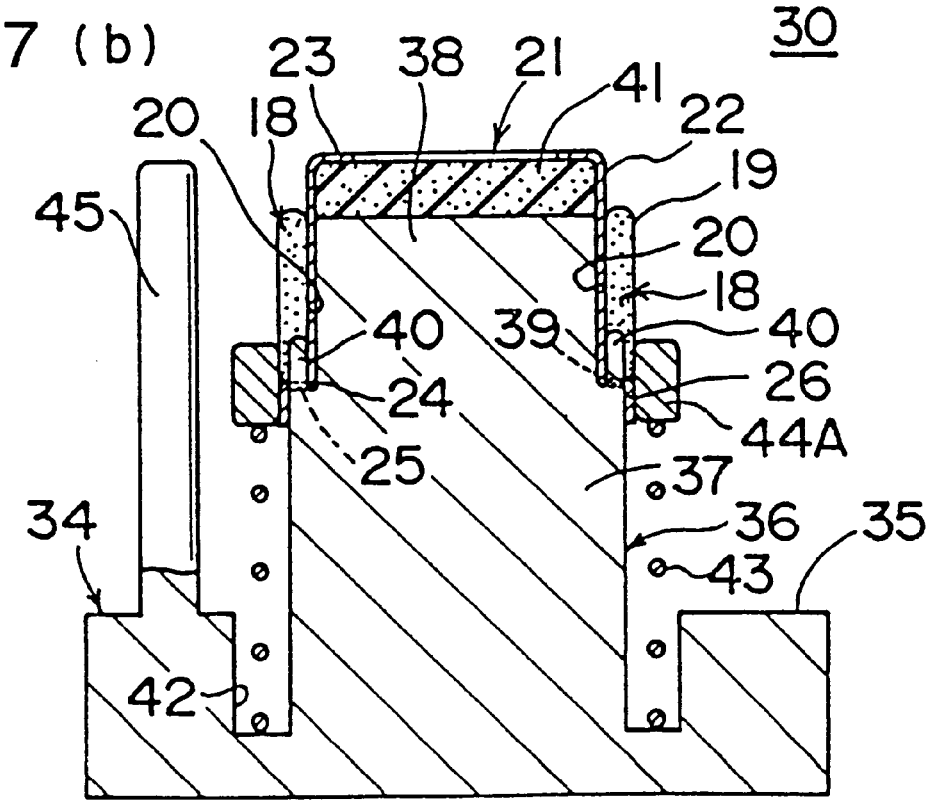
Figure 8:
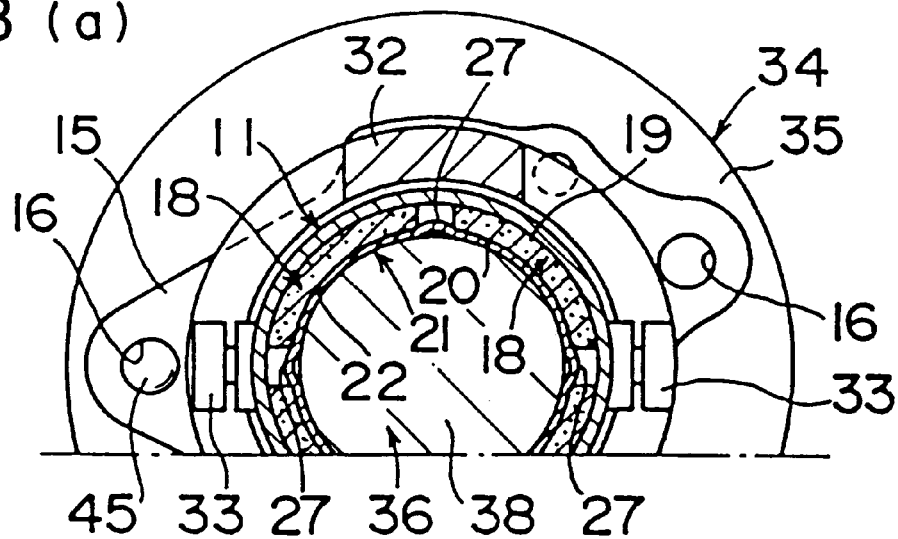
FIG. 8(a) is a partly sectioned schematic plan view showing the step of assembling the yoke.
FIG. 8(b) is a schematic sectional front view corresponding to FIG. 8(a).
Figure 8:
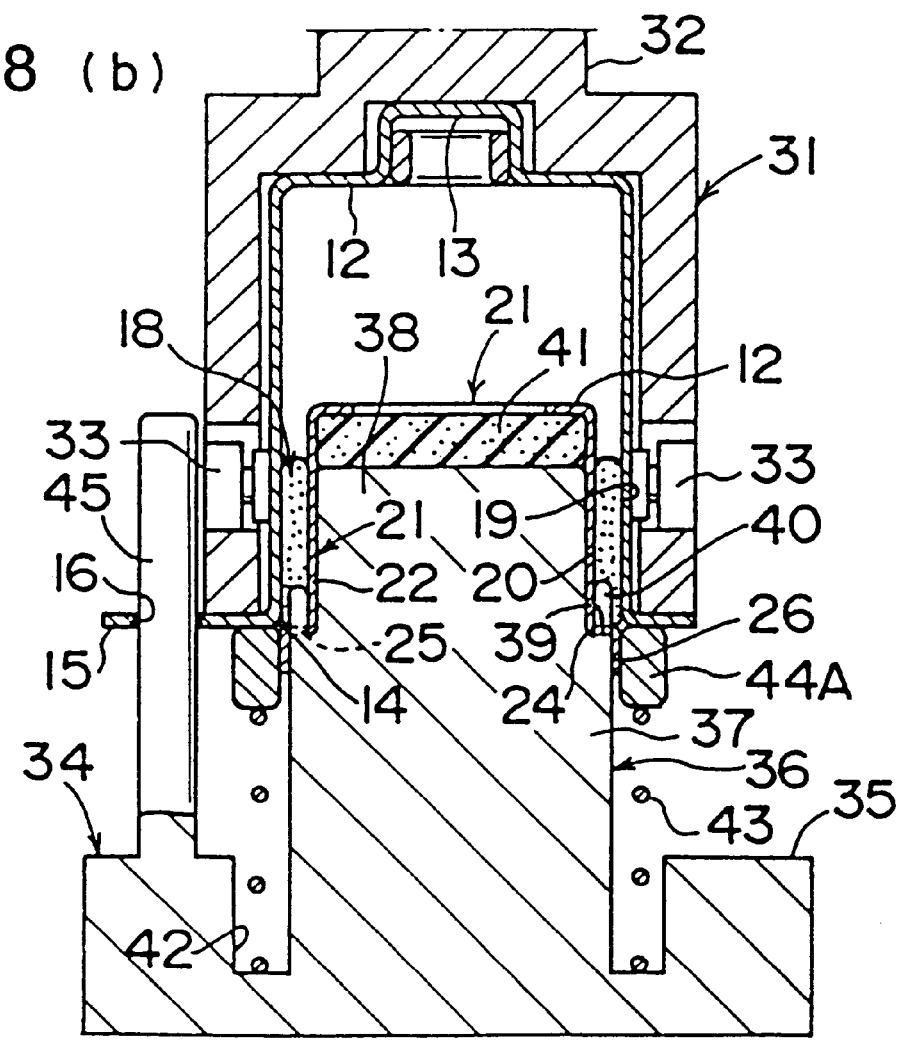
Figure 9A:
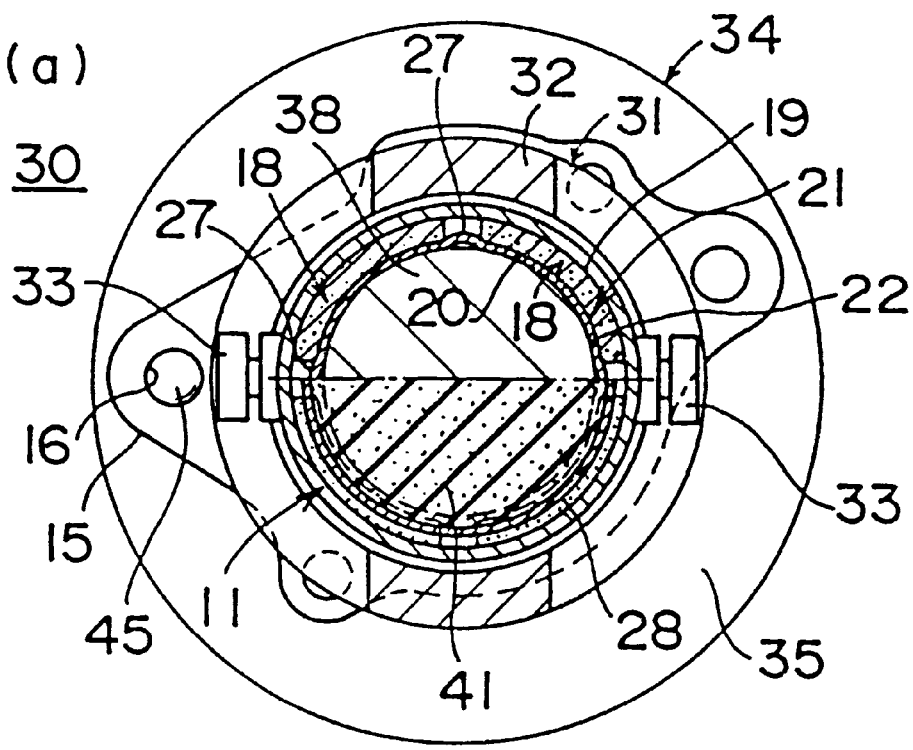
FIG. 9(a) is a partly sectioned schematic plan view showing an final stage of the press-fitting operation.
Figure 9B:
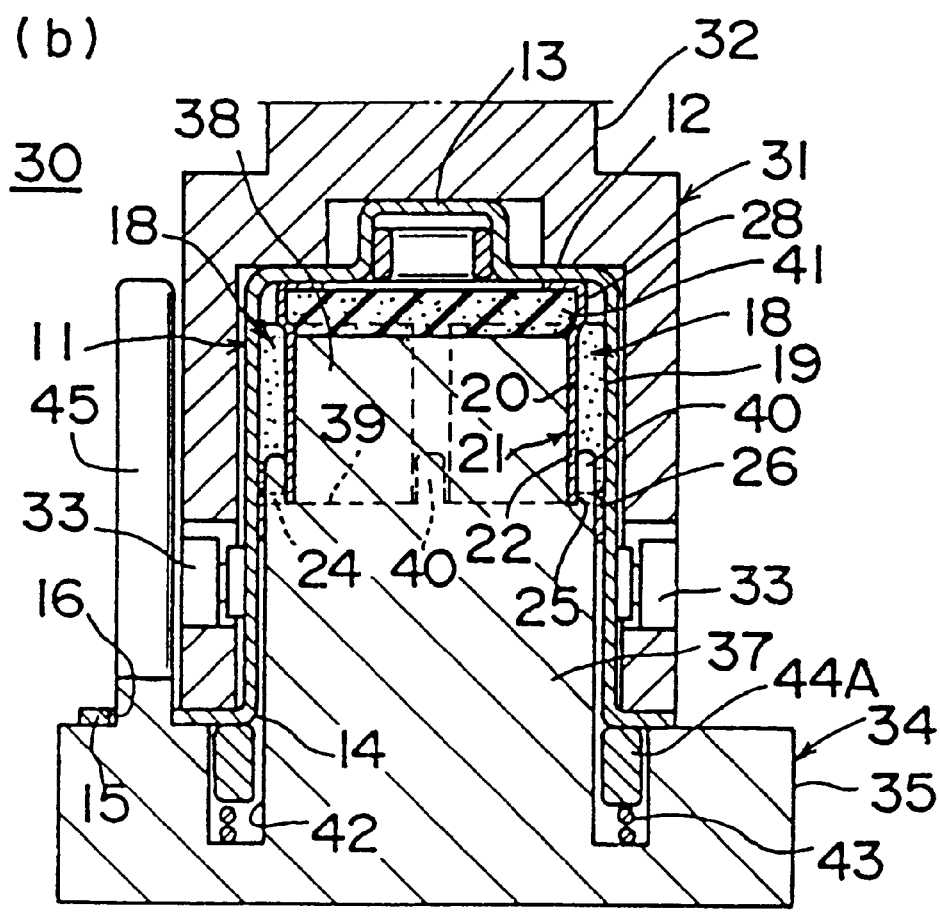
FIG. 9(b) is a schematic sectional front view corresponding to FIG. 9(a).

As the yoke 11 is pushed downward by the die 31 to complete its final stroke as shown in FIG. 5, the resilient body 41 is compressed and forced to bulge radially outwardly by the closure wall 12 of the yoke 11 by way of the collar 23 of the magnet cover 21. Then, as the resilient body 41 bulges, the link section of the main body 22 connected to the collar 23 is also deformed to become bulged to produce an annular bulged section 28 for axial alignment. The bulged section 28 of the magnet cover 21 then engages the magnets 18 at the inner shoulder sections located close to the bottom wall of the yoke 11. Consequently, the magnets 18 are rigidly restricted for any axial movement between the bulged section 28 and the collar 24.

Note that the section 26 has an outer diameter slightly greater than the inner diameter of the yoke 11 before it is press-fitted into the yoke 11. Therefore, as the section 26 is press-fitted into the yoke 11, the magnet cover 21 is rigidly held to the inner periphery of the yoke 11 so that consequently the magnets 18 that are aligned by the magnet cover 21 are rigidly secured to the yoke 11.

Subsequently, the die 31 is raised by the press unit, while the yoke 11 is pinched by the pair of yoke holders 33, 33 at the barrel thereof. Then, the yoke 11 rigidly holding the magnets 18 with the magnet cover 21 is released from the die 34 to produce a stator 10 having a configuration as shown in FIG. 6.

With the above described embodiment, since when the magnets 18 are secured by the magnet cover 21 the magnets 18 and the magnet cover 21 are positioned in the yoke 11 and the die 34, receiving the reaction force of the yoke 11, is introduced into the yoke 11 through the opening thereof and, while the yoke 11 is pressed by the upper die 31. Thus, the yoke 11 does not have to be provided with through holes bored through the closure wall 12 thereof. Therefore, the motor is free from the operation of closing the through holes of the yoke 11 to secure hermetically sealing of the stator 10 after assembling the motor so that the overall manufacturing cost of the motor can be reduced.

FIGS. 7(a) through 9(b) schematically illustrate a second embodiment of the method according to the present invention.

The second embodiment differs from the above described first embodiment in that the keep ring 44A operates also as a magnet keep member, or an anti-side fall device, for the magnets 18. Note that the ring 44A extends above the receiving section 39 and further close to the die 31 than its counterpart of the first embodiment in order to push the magnets 18 from the side of the die 34.

With the second embodiment, the magnet keep member 46 and the drive unit for driving the member can be omitted to further simplify the magnet securing device.

Detailed description has hereinabove been give of the invention achieved by the present inventor with reference to the embodiments. However, the present invention should not be limited to the embodiments described above and may be variously modified within the scope not departing from the gist.

For example, while the upper die is movable in the above embodiments, the lower die may alternatively be made movable. Additionally, a recess may be formed on the outer periphery of the yoke so that the yoke may be aligned with the upper die by means of the recess to omit the guide pole. When the guide pole is omitted, the same press frame may be used for rigidly securing the magnets to a yoke having a differently profiled flange to improve the productivity of assembling stators.

Additionally, while the magnets are rigidly secured to the yoke of the stator of a motor in the above embodiments, the present invention is not limited thereto and the present invention is also applicable to the process of rigidly securing magnets to the yoke of the rotor of the whole revolving electric machine such as a magnet generator.

What is claimed is:

1. A method of securing magnets of a revolving electric machine such that a plurality of magnets are annularly and peripherally arranged at regular intervals on an inner peripheral surface of a hollow cylindrical yoke, having a closed upper end and an open lower end, and rigidly secured to the yoke by a thin-walled hollow cylindrical magnet cover press-fitted to inner peripheral surfaces of the magnets, comprising the steps of:

providing a press frame having upper and lower dies to be closed relative to each other, providing said lower die with an upwardly extending cylindrical column having an upper smaller diameter section and a lower larger diameter section separated from one another by an annular horizontal step, providing a hollow thin walled cylindrical magnet cover having a main body and a horizontal outwardly extending collar at the lower end of the main body, placing the magnet cover over the upper section of the column with the collar resting on the column step, providing an annular holding member surrounding and vertically movable relative to the column, biasing the holding member upwardly to an upper limit position at which at least a part of the holding member extends upwardly beyond the collar resting on the column step to form an upwardly open annular groove between the holding member and a bottom part of the magnet cover main body, arranging a plurality of magnets such as aforesaid in annularly spaced condition about an outer periphery of the magnet cover body with lower ends of said magnets being received in said groove, providing a yoke such as aforesaid, securing said yoke to the upper die of said press frame with said yoke positioned coaxially relative to said magnet cover with the open end of said yoke directed to said magnet cover, and then closing said upper die and said lower die relative to each other to push the yoke over the magnets and to thereby press-fit said magnets and said magnet cover into said yoke, said yoke having a vertical length greater than that of said upper column section so that as the yoke is pushed over the magnets a lower end of the yoke engages the holding member and displaces the holding member downwardly to a position at which the holding member is located below the magnet cover.

2. A method of securing magnets of a revolving electric machine according to claim 1, wherein during the pushing of the yoke over the magnets said magnet cover is forced to outwardly bulge by said magnets to produce bulged sections between adjacently located magnets.

3. A method of securing magnets of a revolving electric machine according to claim 1, and including the further step of before placing the magnet cover on the upper section of the column placing a resilient member on a top of the upper section of the column, the resilient member being so sized and shaped that during the pushing of the yoke over the magnets the resilient member is compressed and radially and outwardly bulged to correspondingly radially outwardly bulge an upper portion of the main body of the magnet cover to form an annular bulge in the main body extending radially over at least portions of upper ends of the magnets.

4. A method of securing magnets of a revolving electric machine according to claim 3, and including the further step of before placing the magnet cover on the upper section of the column forming a radially inwardly extending collar at an upper end of the main body.

5. A method of securing magnets of a revolving electric machine according to claim 1, wherein after said magnets are arranged about an outer periphery of the magnet cover supporting the magnets by a pair of anti-fall jigs for the magnets until the magnets are partly introduced into the yoke.

6. A method of securing magnets of a revolving electric machine according to claim 5, wherein said anti-fall jigs are arranged radially movably relative to said upper section of the column and said magnets arranged along an outer periphery of said magnet cover are pushed radially from outside by said anti-fall jigs.

7. A method of securing magnets of a revolving electric machine according to claim 1, further including the steps of providing the collar with as many small vertically extending holes as said magnets, said small holes being arranged at regular intervals corresponding to the intervals of said magnets; and providing the lower die with aligning projections which file through said holes and extend upwardly from the collar when the magnet cover is placed onto the upper section of the column to angularly locate the magnets relative to the upper column section before the yoke is pushed over the magnets.

8. A method of securing magnets of a revolving electric machine such that a plurality of magnets are annularly and peripherally arranged at regular intervals on the inner peripheral surface of a hollow cylindrical yoke, having a closed end and an open end, and rigidly secured by a thin-walled hollow cylindrical magnet cover press-fitted to the inner peripheral surface of the magnets, comprising the steps of:

providing a vertically movably cylindrical upright magnet cover holding member in a lower die of a press frame having upper and lower dies to be closed relative to each other, temporarily holding a magnet cover in a lower die by means of said magnet cover holding member, placing the magnet cover over the upper end portion of the magnet cover holding member, and arranging said plurality of magnets peripherally along the outer periphery of the magnet cover;

securing said yoke to the upper die of said press frame, arranging said yoke coaxially relative to said magnet cover with the open end of said yoke directed to said magnet cover, closing said upper die and said lower die relative to each other and then press-fitting said magnets and said magnet cover into said yoke, while said magnet cover is held by said magnet cover holding member until said magnet cover is received in said yoke and while pushing the outer peripheral surfaces of said magnets by means of the inner peripheral surface of said yoke;

preforming a radially inwardly extending collar at the upper end of said magnet cover; and providing a resilient member on said lower die adapted to abut the inside of said collar when said magnet cover is temporarily held by said lower die, said resilient member being compressed and radially and outwardly bulged by closing said upper and lower dies relative to each other, so that said magnet cover is bulgingly deformed and positioned axially.

9. A method of securing magnets of a revolving electric machine such that a plurality of magnets are annularly and peripherally arranged at regular intervals on the inner peripheral surface of a hollow cylindrical yoke, having a closed end and an open end, and rigidly secured by a thin-walled hollow cylindrical magnet cover press-fitted to the inner peripheral surface of the magnets, comprising the steps of:

providing a vertically movably cylindrical upright magnet cover holding member in a lower die of a press frame having upper and lower dies to be closed relative to each other, temporarily holding a magnet cover in a lower die by means of said magnet cover holding member, placing the magnet cover over the upper end portion of the magnet cover holding member, and arranging said plurality of magnets peripherally along the outer periphery of the magnet cover;

securing said yoke to the upper die of said press frame, arranging said yoke coaxially relative to said magnet cover with the open end of said yoke directed to said magnet cover, closing said upper die and said lower die relative to each other and then press-fitting said magnets and said magnet cover into said yoke, while said magnet cover is held by said magnet cover holding member until said magnet cover is received in said yoke and while pushing the outer peripheral surfaces of said magnets by means of the inner peripheral surface of said yoke;

forming a radially and outwardly projecting outside collar at an end of said magnet cover and said collar with as many small holes as said magnets, said small holes being arranged at regular intervals corresponding to the intervals of said magnets; and providing said lower die with aligning projections adapted to be received respectively by said small holes in order to peripherally align said magnets when said upper and lower dies are closed relative to each other.

* * * * *